US009021036B2

(12) United States Patent
Ku et al.

(10) Patent No.: US 9,021,036 B2
(45) Date of Patent: Apr. 28, 2015

(54) METHOD, SERVER AND CLIENT FOR AGGREGATING MICROBLOG SINGLE MESSAGE

(75) Inventors: Yu Ku, Shenzhen (CN); Yuewei Chen, Shenzhen (CN); Hongjie Liu, Shenzhen (CN); Changwen Yuan, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 333 days.

(21) Appl. No.: 13/613,451

(22) Filed: Sep. 13, 2012

(65) Prior Publication Data

US 2013/0013707 A1 Jan. 10, 2013

Related U.S. Application Data

(63) Continuation of application No. PCT/CN2011/078449, filed on Aug. 16, 2011.

(30) Foreign Application Priority Data

Sep. 1, 2010 (CN) .......................... 2010 1 0276111

(51) Int. Cl.
*G06F 15/16* (2006.01)
*H04L 12/18* (2006.01)
(Continued)

(52) U.S. Cl.
CPC ............. *H04W 4/12* (2013.01); *H04L 12/1831* (2013.01); *H04L 67/02* (2013.01)

(58) Field of Classification Search
CPC ... H04L 12/1831; H04L 12/586; H04L 67/02; H04L 51/16
USPC .................................................. 709/203, 223
See application file for complete search history.

(56) References Cited

U.S. PATENT DOCUMENTS 7,734,610 B2 6/2010 Rakowski et al.
2009/0276500 A1* 11/2009 Karmarkar .................... 709/206
(Continued)

FOREIGN PATENT DOCUMENTS

CN 101336408 A 12/2008
CN 101742444 A 6/2010
(Continued)

OTHER PUBLICATIONS

Written Opinion (English Translation), International application No. PCT/CN2011/078449, Nov. 24, 2011.
(Continued)

*Primary Examiner* — Waseem Ashraf
(74) *Attorney, Agent, or Firm* — Marshall, Gerstein & Borun LLP

(57) ABSTRACT

Embodiments of the application provide a method, server, client and system for aggregating a microblog single message. The method includes: triggering, by a user, to aggregate a microblog single message; and displaying a relaying process of the microblog single message for the user. The server includes: a receiving module, which is to receive a triggering message to aggregate a microblog single message from a client; an obtaining module, which is to obtain aggregation data of the microblog single message, according to the triggering message; a transmitting module, which is to transmit the aggregation data of the microblog single message obtained by the obtaining module to the client. Embodiments of the application also provide a corresponding client and system. By adopting the technical solution of the application, a user may clearly see a message relaying process. Thus, user satisfaction may be improved.

9 Claims, 6 Drawing Sheets

(51) Int. Cl.
*H04W 4/12* (2009.01)
*H04L 29/08* (2006.01)

(56) References Cited

U.S. PATENT DOCUMENTS

| | | | |
|---|---|---|---|
| 2010/0042615 A1 | 2/2010 | Rinearson | |
| 2010/0082751 A1* | 4/2010 | Meijer et al. | 709/206 |
| 2010/0312769 A1* | 12/2010 | Bailey et al. | 707/740 |
| 2011/0196933 A1* | 8/2011 | Jackson et al. | 709/206 |
| 2012/0042020 A1* | 2/2012 | Kolari et al. | 709/206 |
| 2012/0136939 A1* | 5/2012 | Stern et al. | 709/206 |
| 2012/0323928 A1* | 12/2012 | Bhatia | 707/748 |
| 2013/0246592 A1* | 9/2013 | Gartside et al. | 709/223 |

FOREIGN PATENT DOCUMENTS

| | | | |
|---|---|---|---|
| JP | 2002-183039 A | 6/2002 | |
| JP | 2007102502 A | 4/2007 | |
| JP | 2008299764 A | 12/2008 | |

OTHER PUBLICATIONS

International Preliminary Report on Patentability (English translation), International application No. pct/cn2011/078449, Mar. 5, 2013.

International Search Report for PCT/CN2011/078449 dated Nov. 24, 2011.

Phuvipadawat, et al. "Breaking News Detection and Tracking in Twitter," IEEE Computer Society 120-123 (2010).

Yang, et al. "Predicting the Speed, Scale, and Range of Information Diffusion in Twitter," Proceedings of the Fourth International AAAI Conference, 355-358; 1-5 (2010).

The WI-IAT2010 Final Program, 9 pages (2010).

Office Action and English translation from Japanese Application No. 2013-500327 dated Nov. 5, 2013.

Office Action from Russian Application No. 2012142819 dated Mar. 21, 2014.

Office action from Chinese Application No. 201010276111.7 (CN OA2) dated Jun. 17, 2014, with concise explanation of relevance.

Office action from Chinese Application No. 201010276111.7 (CN OA1) dated Oct. 10, 2013, with concise explanation of relevance.

Office action from Chinese Application No. 201010276111.7 (CN OA3) dated Sep. 18, 2014, with concise explanation of relevance.

Webpage (D1) titled "Share anytime and anywhere! Get a full experience for Sina microblog clients," (2008).

Webpage (D2) title Hannah appeared. Tencent microblog is on probation in Android mobile clients (2010).

* cited by examiner

METHOD, SERVER AND CLIENT FOR AGGREGATING MICROBLOG SINGLE MESSAGE

CROSS-REFERENCE TO RELATED APPLICATIONS

This is a continuation of International Patent Application No. PCT/CN2011/078449 filed Aug. 16, 2011, which claims the priority benefit of Chinese Patent Application No. CN 201010276111.7 filed Sep. 1, 2010, the entire respective disclosures of which are incorporated herein by reference.

TECHNICAL FIELD

The application relates to computer technologies, and more particularly, to a method, server, and client for aggregating a microblog single message.

BACKGROUND OF THE INVENTION

Microblog products in our country are at an initial stage and used by a large number of users. The microblog products have been widely used not only in usual entertainment, but also in users' daily work.

In current mainstream microblog client software, microblog messages are presented altogether on a QQ main panel in chronological order. When a large number of users focused on the microblog messages, meanwhile home page messages scroll and refresh faster, and then it is difficult to present much information within relatively limited space on the main panel. Thus, displaying about details of a single message may be not clear and complete enough, which directly affect users' product experience.

Besides, in existed microblog client software, since current user may only see messages about each user focused on by current user, current user doesn't learn relaying chain about each message. Since current user doesn't focus on publishers of previous relaying chain, messages about previous relaying chain are invisible to current user. For example, the whole path of a single message chain is A-B-C-D-E, current user only focuses on messages about E. Thus, current user may only see E, and doesn't learn previous message chain.

Thus, in current mainstream microblog client software applications, users put forward higher requirements for ease of use, stability and safety of microblog software. A user may hope to learn detailed information about a certain microblog message, and may hope to see the relaying process of the certain microblog message, so as to learn the microblog relationship chain more conveniently.

SUMMARY OF THE INVENTION

In view of above, embodiments of the application provide a method, server, client and system for aggregating a microblog single message, to enable a user to access an independent page about an interested message with an entry, and enable the user to clearly see the relaying process about the message.

An embodiment of the application provides a method for aggregating a microblog single message, including:
  receiving a user instruction;
  sending a triggering message to aggregate the microblog single message to a server, according to the user instruction;
  receiving or obtaining aggregation data of the microblog single message from the server; and
  displaying the aggregation data of the microblog single message.

An embodiment of the application provides a server for aggregating a microblog single message, including a receiving module, an obtaining module and a transmitting module, wherein
  the receiving module is to receive a triggering message to aggregate the microblog single message sent by a client;
  the obtaining module is to obtain aggregation data of the microblog single message, according to the triggering message; and
  the transmitting module is to transmit the aggregation data of the microblog single message obtained by the obtaining module to the client.

An embodiment of the application provides a client for aggregating a microblog single message, including an interacting module, a data receiving and obtaining module and a displaying module, wherein
  the interacting module is to receive a user instruction, and send a triggering message to aggregate the microblog single message to a server according to the user instruction;
  the data receiving and obtaining module is to receive or obtain aggregation data of the microblog single message from the server; and
  the displaying module is to display the aggregation data of the microblog single message.

By adopting the above technical solution of the application, a user at any page may be enabled to access an independent page about an interested message with an entry. Besides, the user may be able to see the message relaying process clearly, with the provided aggregation function about a single message. Meanwhile, the user may be enabled to learn a relationship chain corresponding to the microblog more conveniently. Thus, user experience may be improved.

BRIEF DESCRIPTIONS OF THE DRAWINGS

EMBODIMENTS OF THE INVENTION

To make objectives, technical solutions and advantages of the application more clear, detailed descriptions about the application are provided in the following accompanying with attached figures and specific embodiments.

Figure 1:
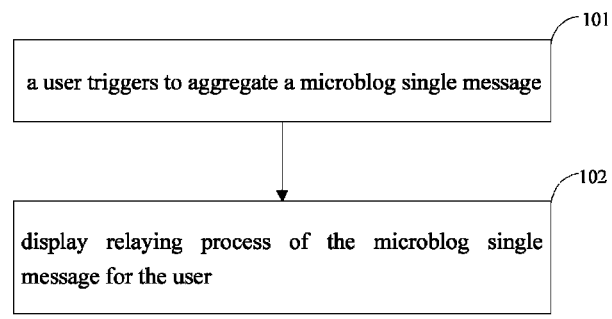
FIG. 1 is a flowchart illustrating a method for aggregating a microblog single message, in accordance with an embodiment of the application.

FIG. 1 is a flowchart illustrating a method for aggregating a microblog single message, in accordance with an embodiment of the application. As shown in FIG. 1, the method includes the following blocks.

Block 101, a user triggers to aggregate a microblog single message.

When the user wants to see relaying process about a certain interested microblog single message, the user may trigger to aggregate the microblog single message.

Block 102, display the relaying process about the microblog single message for the user.

Figure 2:
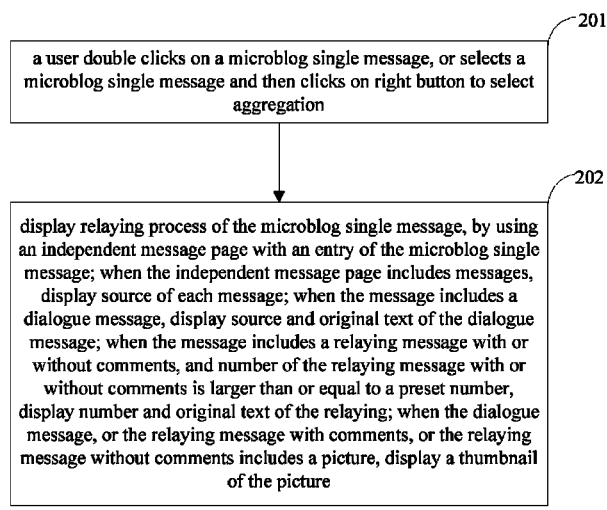
FIG. 2 is a flowchart illustrating a method for aggregating a microblog single message, in accordance with another embodiment of the application.

FIG. 2 is a flowchart illustrating a method for aggregating a microblog single message, in accordance with another embodiment of the application. As shown in FIG. 2, the method includes the following blocks.

Block 201, a user may double click on a specific microblog single message from any of home page, @ page and guest page of microblog client, to trigger aggregation of the microblog single message. Alternatively, the user may select a microblog single message, and click on right button to select "aggregate", so as to trigger the aggregation of the microblog single message.

Block 202, display relaying process of the microblog single message, by using an independent message page carrying an entry of the microblog single message.

When the independent message page includes at least one message, display source of each message, that is, display each message is sent by which terminal or user.

When the message includes a dialogue message, source and original text of the dialogue message may be displayed. The whole relaying chain reaching the user may also be viewed with the original text.

When the message includes a relaying message with or without comments, meanwhile number of the relaying message with or without comments is larger than or equal to a preset number, e.g., 10, the relaying original text and relaying number may be displayed.

When the message text, e.g., dialogue message, or relaying message with comments, or relaying message without comments, includes a picture, the picture thumbnail may be displayed. Meanwhile, the thumbnail may support various operations, such as copy, open, etc.

Figure 3:
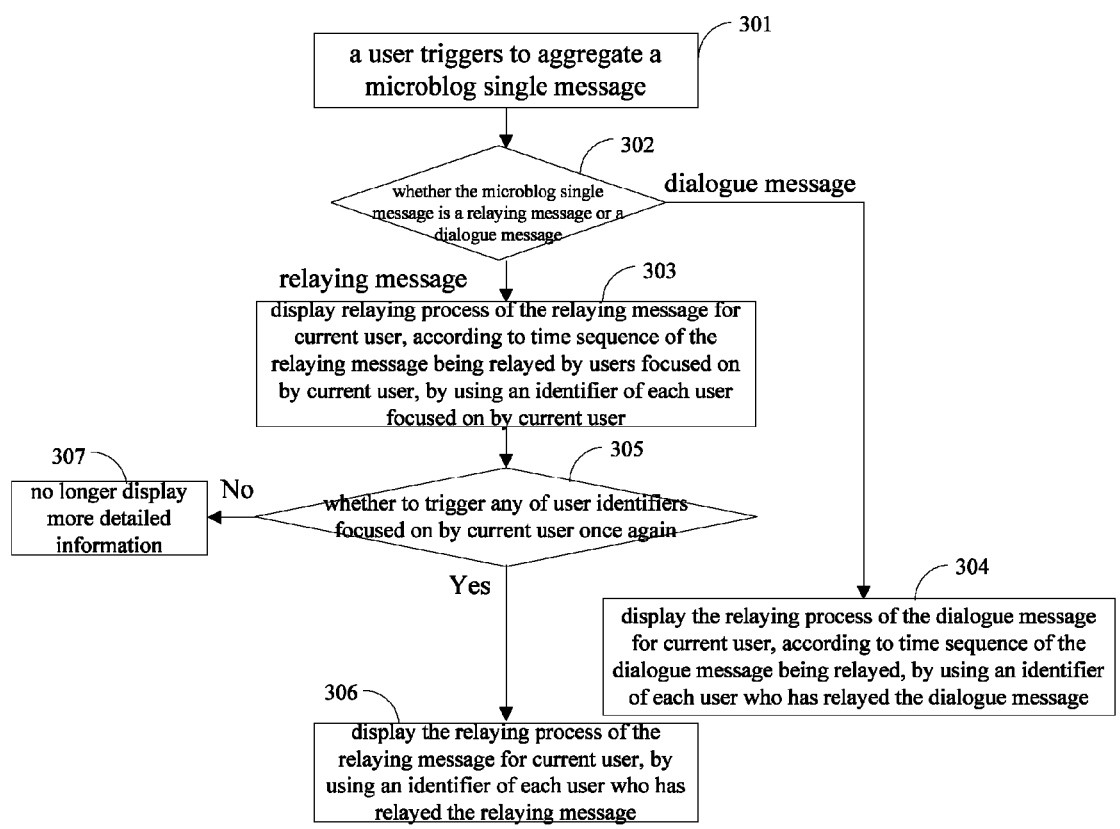
FIG. 3 is a flowchart illustrating a method for aggregating a microblog single message, in accordance with still another embodiment of the application.

FIG. 3 is a flowchart illustrating a method for aggregating a microblog single message, in accordance with another embodiment of the application. As shown in FIG. 3, the method includes the following blocks.

Block 301, a user triggers to aggregate a microblog single message.

Block 302, determine whether the microblog single message requested to be aggregated by the user is a relaying message or a dialogue message. When the microblog single message requested to be aggregated by the user is a relaying message, proceed with block 303; otherwise, proceed with block 304.

Block 303, display relaying process of the relaying message for current user, according to time sequence of the relaying message being relayed by users focused on by current user, by using identifiers of users focused on by current user.

Specifically, the block may be implemented with the following two modes, but not limited to the two modes in the following.

The first mode, based on an identifier of a node corresponding to the microblog single message requested to be aggregated, that is, the relaying message, search for identifier of each ancestor node of the node. The ancestor node refers to father node of the node corresponding to the microblog single message, father node of the father node searched out, until root node.

And then, based on all the ancestor nodes searched out, determine which ancestor node was focused on by current user. Display the relaying process of the relaying message for current user, according to time sequence of the relaying message being relayed by users focused on by current user, by using identifiers of users focused on by current user.

The second mode is to store identifiers of all the users focused on by current user, and messages relayed by all the users focused on by current user, into a client.

In the messages relayed by each user focused on by current user, search in sequence for the microblog single message requested to be aggregated, that is, the relaying message, according to time sequence of the messages being focused on by current user. When the relaying message is searched out from messages relayed by a user who was focused on by current user, record identifier of the user who was focused on by current user, until all the messages relayed by all the users focused on by current user have been traversed.

And then, display the relaying process of the relaying message for current user, according to relaying time sequence and recorded identifier of each user focused on by current user.

Block 304, display the relaying process of the dialogue message for current user, according to relaying time sequence, by using identifier of each user who has relayed the dialogue message.

Block 305, determine whether any identifier of users focused on by current user has been triggered once again, if yes, proceed with block 306; otherwise, proceed with block 307.

Block 306, display the relaying process of the relaying message for current user, by using identifier of each user who has relayed the relaying message.

Block 307, no longer display more detailed information.

Figure 4:
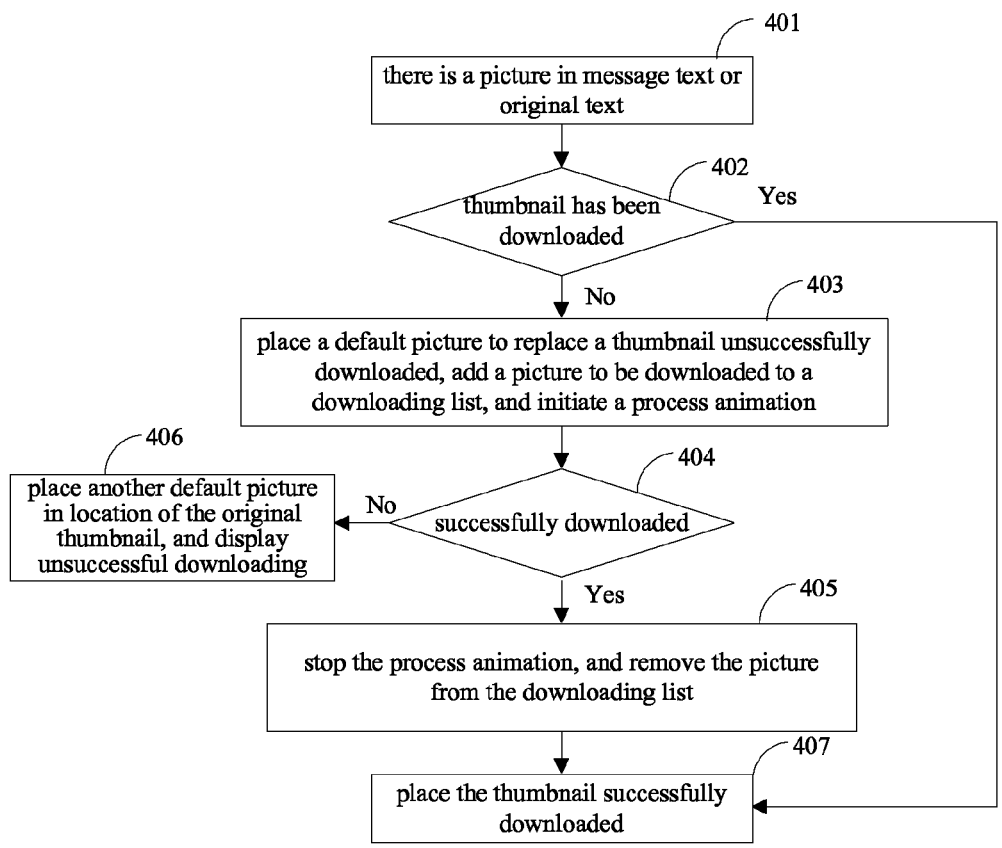
FIG. 4 is a flowchart illustrating a method for downloading a thumbnail, when there is a picture in original text or message text of an independent message page, in accordance with an embodiment of the application.

FIG. 4 is a flowchart illustrating a method for downloading a thumbnail, when there is a picture in original text or message text of an independent message page, during the process of displaying relaying process of a certain microblog single message for current user with the independent message page, in accordance with an embodiment of the application. As shown in FIG. 4, the method includes the following blocks.

Block 401, based on the method described with the embodiment shown in FIG. 2, during the process of displaying the relaying process of the microblog single message with an independent message page, which carries an entry of the microblog single message, when there is a picture in message text or original text of the independent message page, proceed with block 402.

Block 402, determine whether a thumbnail corresponding to the picture has been downloaded successfully, if yes, proceed with block 407; otherwise, proceed with block 403.

Block 403, place a default picture to replace the thumbnail to be downloaded, add the picture to be downloaded to a downloading list, initiate a process animation, and then proceed with block 404.

Block 404, determine whether the thumbnail corresponding to the picture has been downloaded successfully, if yes, proceed with block 405; otherwise, proceed with block 406.

Block 405, stop the process animation, remove the picture from the downloading list, and proceed with block 407.

Block 406, place another default picture at the location of the original thumbnail, e.g., display the picture indicating unsuccessful downloading.

Block 407, place the thumbnail successfully downloaded at the location of the original thumbnail.

Figure 5:
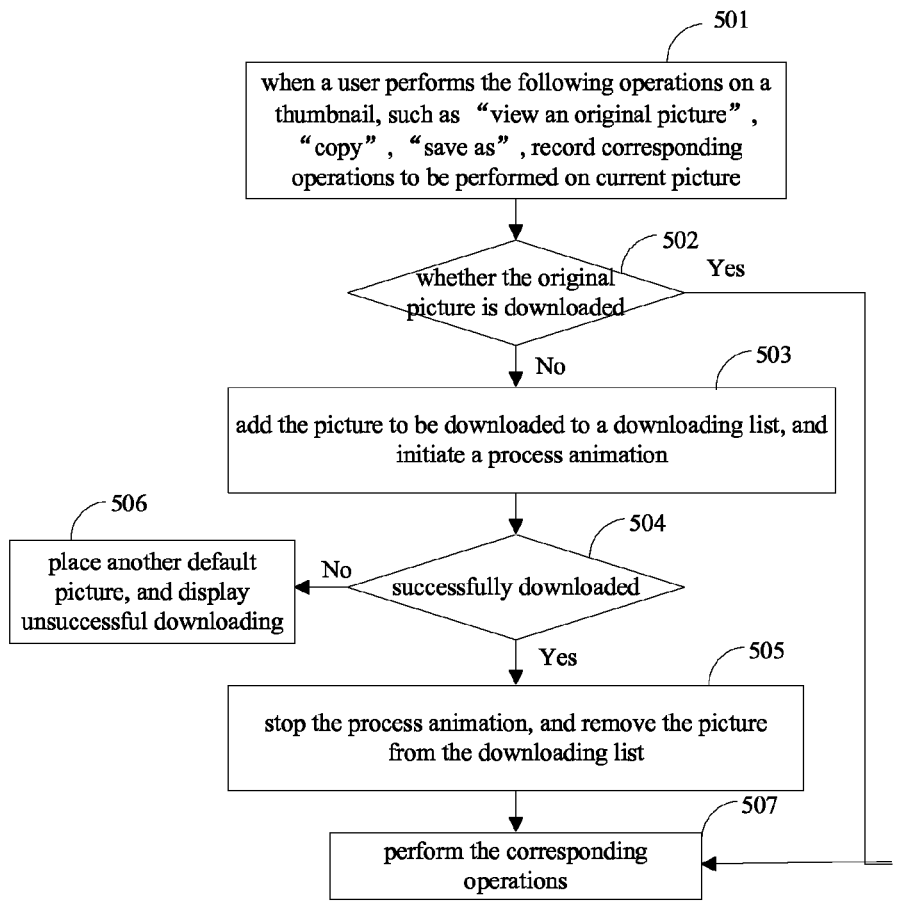
FIG. 5 is a flowchart illustrating a method for performing corresponding operations on a thumbnail, when a user performs operations on the thumbnail, in accordance with an embodiment of the application.

FIG. 5 is a flowchart illustrating a method for performing corresponding operations on a thumbnail, when a user performs operations on the thumbnail, during the process of displaying relaying process of a specific microblog message for the user with an independent message page, in which a picture is included in the message text or original text of the independent message page, in accordance with an embodiment of the application. As shown in FIG. 5, the method includes the following blocks.

Block 501, when a user performs operations on a thumbnail, such as "view an original picture", "copy", "save as", record a corresponding operation to be performed on current picture which has been selected by the user recently.

Block 502, determine whether the original picture has been downloaded, if yes, proceed with block 507; otherwise, proceed with block 503.

Block 503, add a picture to be downloaded to a downloading list, initiate a process animation, and proceed with block 504.

Block 504, determine whether the picture has been downloaded successfully, if yes, proceed with block 505; otherwise, proceed with block 506.

Block 505, stop the process animation, and remove the picture from the downloading list.

Block 506, place another default picture, and display unsuccessful downloading.

Block 507, perform corresponding operations, according to corresponding operation to be performed on current picture, which are recorded in block 501.

For example, when a user clicks on "view an original picture" with right button, it is necessary to trigger the logic for downloading the original picture. At this time, there may be a downloading animation for the thumbnail corresponding to the picture. It should be noted that, at this time, when network speed is relatively slow, the user may perform operations on the picture or other pictures more than once, such as "view an original picture", "copy" and "save as". Thus, new downloading may be triggered. To avoid new downloading unnecessary, the following modes may be employed.

For example, employ a mapping table within a program to store a downloading picture list, so as to shield repeated downloading of a picture. Meanwhile, employ another mapping table to store the final operation to be performed on the corresponding picture, which is recorded in block 501. When picture downloading is finished, only perform the final operation. For example, when a user firstly selects "view an original picture", and then immediately selects "save as". Thus, the final operation is "save as".

In the embodiment, when the user selects "view an original picture", call a function to run an external program. In a windows system, such as Windows XP system, Windows 2000 system, ShellExecute function may be called. Take the Windows XP system for an example, when there is no default picture viewer for the picture, return value of the called ShellExecute function will be smaller than 32. At this time, based on the return value of the ShellExecute function, "open mode" selection box may be opened, to facilitate the user to select a picture viewer to view the picture.

Figure 6:
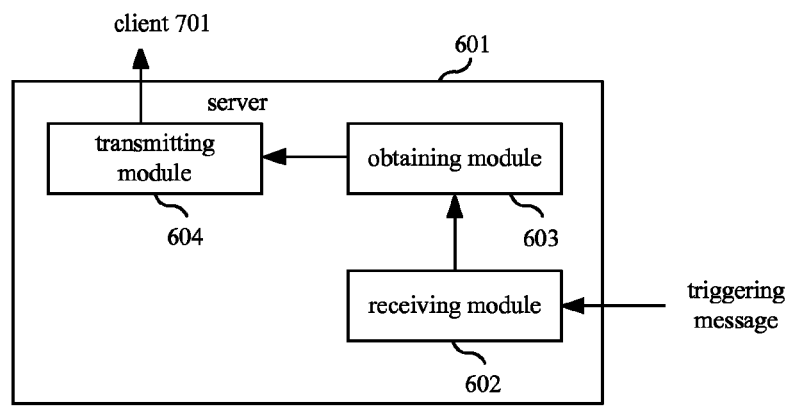
FIG. 6 is a schematic diagram illustrating structure of a server for aggregating a microblog single message, in accordance with an embodiment of the application.

FIG. 6 is a schematic diagram illustrating structure of a server for aggregating a microblog single message, in accordance with an embodiment of the application. As shown in FIG. 6, a server 601 includes a receiving module 602, an obtaining module 603 and a transmitting module 604.

The receiving module 602 is to receive a triggering message to aggregate a microblog single message from client 701.

The obtaining module 603 is to obtain aggregation data of the microblog single message based on the triggering message.

The transmitting module 604 is to transmit the aggregation data of the microblog single message obtained by the obtaining module 603 to the client 701, to facilitate the client 701 to display for the user.

Figure 7:
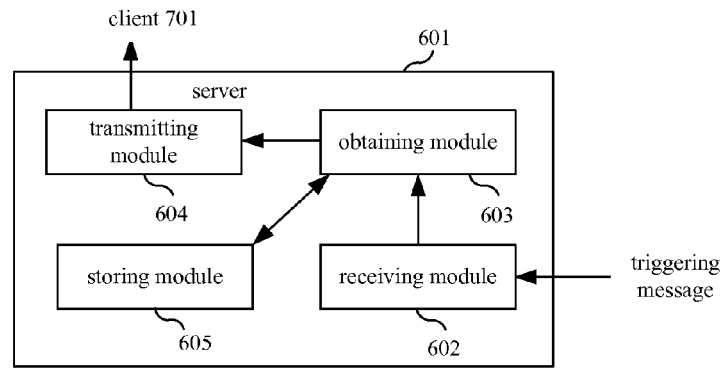
FIG. 7 is a schematic diagram illustrating structure of a server for aggregating a microblog single message, in accordance with another embodiment of the application.

FIG. 7 is a schematic diagram illustrating structure of a server for aggregating a microblog single message, in accordance with another embodiment of the application. As shown in FIG. 7, in addition to the receiving module 602, the obtaining module 603 and the transmitting module 604, the server 601 further includes a storing module 605.

Functions of the receiving module 602 are same as that in the embodiment illustrated with FIG. 6, which are not repeated here.

The storing module 605 is to store aggregation data of the microblog single data. The aggregation data of the microblog single message includes information about a node corresponding to the microblog single message and information about ancestor node thereof. The ancestor node refers to father node of the node corresponding to the microblog single message, father node of the father node, until root node.

The obtaining module 603 is further to obtain an identifier of each ancestor node of the node corresponding to the microblog single message.

The transmitting module 604 is further to, transmit identifier of the node corresponding to the microblog single message and the identifier of each ancestor node thereof, both of which are obtained by the obtaining module 603, to the client 701, so as to display for the user.

That is, for each relayed microblog message, the server stores identifier information about father node of the node corresponding to the microblog message, identifier information about father node of the father node, until identifier information about the root node. When aggregation is necessary, current node may be taken as a basis to obtain all the nodes in a father chain upwards, so as to form an aggregation chain of the single message.

Definitely, other modes may be employed by a server for aggregating a microblog single message. For example, a server may be formed by an access layer for relaying and aggregating a single message, a module for aggregating and performing logic process on a single message, a data cache layer for aggregating a single message, and a microblog data storing module (not shown in Figure).

The access layer for relaying and aggregating a single message is in charge of unified accessing when visited by upper layer terminal, so as to avoid illegal visit. Meanwhile, the access layer for relaying and aggregating a single message is also to shield lower layer module for aggregating and performing logic process on a single message, to enable deployment of processing modules to be relatively independent. When receiving a triggering message to aggregate a specific microblog message, which is sent by a client, e.g., QQ client or other client, the access layer for relaying and aggregating a single message may determine whether the triggering message is sent by a designated protocol; if yes, send the triggering message to the module for aggregating and performing a logic process on a single message.

Subsequently, based on the triggering message received, the module for aggregating and performing a logic process on a single message may obtain father node identifier (ID) from the microblog data storing module, according to ID of the node corresponding to the microblog single message requested to be aggregated, and then, obtain father node ID of the father node ID which has already been obtained, until ID of a root node has been obtained. Thus, the whole aggregation chain expected by a service layer may be obtained after pulling many times. Meanwhile, to ensure pulling efficiency, concurrent and asynchronous processes may be executed. Partial intermediate data and result data may be buffered, to avoid putting too much pressure on the microblog data storing module.

Figure 8:
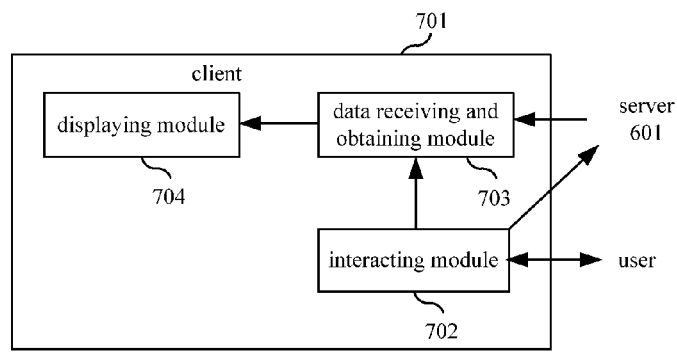
FIG. 8 is a schematic diagram illustrating structure of a client for aggregating a microblog single message, in accordance with an embodiment of the application.

FIG. 8 is a schematic diagram illustrating structure of a client for aggregating a microblog single message, in accordance with an embodiment of the application. As shown in FIG. 8, client 701 includes an interacting module 702, a data receiving and obtaining module 703, and a displaying module 704.

The interacting module 702 is to interact with a user, send a triggering message to aggregate a microblog single message to server 601 according to user instruction, and send a message to the data receiving and obtaining module 703 to indicate to receive or obtain aggregation data of the microblog single message from the server.

The data receiving and obtaining module 703 is to receive or obtain the aggregation data of the microblog single message from server 601, according to the message sent by the interacting module 702.

The displaying module 704 is to display the aggregation data of the microblog single message, which is obtained by the data receiving and obtaining module 703, for the user.

To enable server load as low as possible when service quality is satisfied, under the circumstances that a relaying chain of a message is relatively long, when pulling all the messages about the relaying chain at a time, huge load may be brought to the server. Take client application scenario into consideration, the strategy of batch and pulling many times may be employed in the embodiment of the application. The data receiving and obtaining module 703 is to receive or obtain preset number of messages from the aggregation data of the microblog single message stored in the server 601 at a time. Take into account the minimum byte number length limitation of a network exchange between client and server in a network, as well as an average length of a relayed and aggregated message, 15 relayed and aggregated messages are allowed to be pulled at a time in the embodiment. When a user has seen current page and scrolled down to the bottom, next batch pulling process may be triggered, until a preset number of messages have been pulled, for example, after pulling 120 messages, no longer to pull as a response to triggering event at the bottom of scroll bar. Instead, prompt the user to view more, so as to enable the user to manually click on to jump to corresponding webpage.

Figure 9:
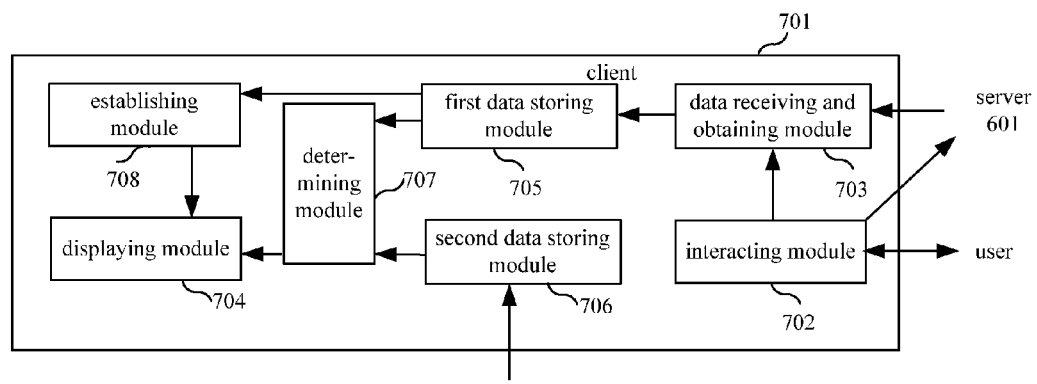
FIG. 9 is a schematic diagram illustrating structure of a client for aggregating a microblog single message, in accordance with another embodiment of the application.

FIG. 9 is a schematic diagram illustrating structure of a client for aggregating a microblog single message, in accordance with another embodiment of the application. As shown in FIG. 9, in addition to the interacting module 702, the data receiving and obtaining module 703, the displaying module 704, the client 701 further includes a first data storing module 705, a second data storing module 706, a determining module 707 and an establishing module 708.

Functions of the interacting module 702 as well as the data receiving and obtaining module 703 are same as that in the embodiment illustrated with FIG. 8, which are not repeated here.

The first data storing module 705 is to store aggregation data of a microblog single message received or obtained by the data receiving and obtaining module 703 from the server 601. The aggregation data includes an identifier of a node corresponding to the microblog single message and identifier of each ancestor node thereof. The ancestor node includes father node of the node corresponding to the microblog single message, father node of the father node, until a root node.

When the microblog single message is a relaying message, the second data storing module 706 is to store an identifier of each user focused on by current user according to time sequence.

When the microblog single message is a relaying message, the determining module 707 is to determine, which of the identifier of the node corresponding to the relaying message and identifier of each ancestor node thereof stored in the first data storing module 705, is stored in the second data storing module 706, and to send each node identifier stored in the second data storing module 706 to the displaying module 704.

After the first data storing module 705 stores the aggregation data of the microblog single message received or obtained by the data receiving and obtaining module 703 from the server 601, that is, obtain data related with an independent message page to be established in the following, the establishing module 708 is to establish an independent message page with an entry of the microblog single message.

When the microblog single message is a relaying message, the displaying module 704 is further to, receive the node identifiers stored in the second data storing module 706 which are sent by the determining module 707, and display the relaying process of the relaying message relayed by users focused on by current user for current user according to relaying time sequence, by using the independent message page established by the establishing module 708 and node identifiers. When the microblog single message is a relayed dialogue message, the displaying module 704 is further to, display the identifier of the node corresponding to the microblog single message and an identifier of each ancestor node thereof for current user according to relaying sequence, based on the aggregation data stored in the first data storing module 705, by using the independent message page established by the establishing module 708.

Specifically, when the independent message page includes at least one message, the displaying module 704 is further to display source of each message, e.g., the message is sent by which terminal or user. When the message includes a dialogue message, the displaying module 704 is further to display original text of the dialogue message. When the message includes a relaying message with or without comments, and when relaying number of the relaying message with or without comments is larger than or equal to a preset number, the displaying module 704 is further to display relaying number and original relaying contents. When there is neither relaying message nor dialogue message in the message, the displaying module 704 is only to display detailed contents of the message. When message text, such as, dialogue message, relaying message with or without comments, or message original text, includes a picture, the displaying module 704 is to further display a thumbnail of the picture. The thumbnail here may support various operations, such as, copy, open, save as, view, which may refer to foregoing embodiments illustrated with FIG. 4 and FIG. 5, which are not repeated here.

When the microblog single message is a relaying message, the client 701 may also be implemented with the following modes. For example, the client 701 may be configured to save identifiers of all the users focused on by current user, and messages relayed by all the users focused on by current user.

Search in all the messages relayed by users focused on by current user for the microblog single message requested to be aggregated, that is, the relaying message, according to time sequence of each user focused on by current user. When the relaying message is searched out from messages relayed by a certain user focused on by current user, record identifier of the certain user, until all the messages relayed by all the users focused on by current user have been traversed.

And then, display the relaying process of the relaying message relayed by each user focused on by current user, according to relaying sequence, and by using recorded identifier of each user focused on by current user.

In the processes for designing the client and server in the embodiments of the application, loosely coupled structure and server load as low as possible are aimed to be achieved. To obtain a loosely coupled code design framework, design ideas of hierarchical module are employed, to encapsulate related logic functions into one layer. An abstract data structure, such as an interface or a pure virtual function, may be employed to express relationship among different layers, to enable code reusability to be better.

Based on foregoing design concept, the client 701 may also be implemented with other modes. For example, divide the client 701 into a presentation layer, a service logic layer and a data layer (which are not shown in the Figure). The presentation layer therein is to encapsulate interactions with users. The server logic layer, which is taken as a core function layer of the client, is mainly in charge of functional logic process and state storage. The data layer is to obtain data from a server, such as pull data, and organize the obtained data.

Figure 10:
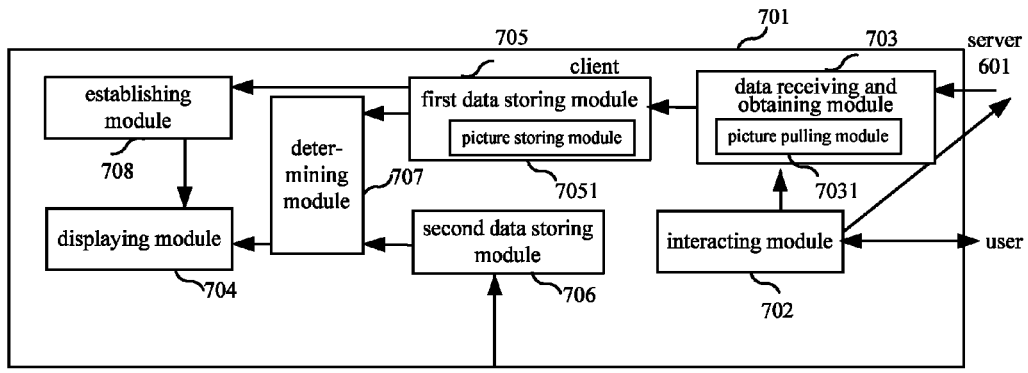
FIG. 10 is a schematic diagram illustrating structure of a client for aggregating a microblog single message, in accordance with still another embodiment of the application.

FIG. 10 is a schematic diagram illustrating structure of a client for aggregating a microblog single message, in accordance with another embodiment of the application. The differences between FIG. 10 and FIG. 9 are as follows. In FIG. 10, the first data storing module 705 further includes a picture storing module 7051, the data receiving and obtaining module 703 further includes a picture pulling module 7031.

Functions of each of the interacting module 702, the second data storing module 706, the determining module 707 and the establishing module 708 in FIG. 10 are respectively same as that in FIG. 9, which are not repeated here.

When message text includes a thumbnail, in addition to displaying the aggregation data of the microblog single message obtained by the data receiving and obtaining module 703 for current user, the displaying module 704 in FIG. 10 is further to display the thumbnail successfully downloaded. The specific descriptions are as follows.

When the message text, such as dialogue message, relaying message with or without comments, or the message original text includes a thumbnail, the picture pulling module 7031 is to determine whether the picture storing module 7051 has stored the thumbnail successfully downloaded. If yes, the displaying module 704 is further to display the thumbnail successfully downloaded; otherwise, the picture pulling module 7031 is further to download the thumbnail from the server 601, add the picture to be downloaded to a downloading list, and initiate a process animation. When the downloading is successful, the displaying module 704 is to stop the process animation, remove the picture from the downloading list, and send the thumbnail successfully downloaded to the picture storing module 7051 to be stored.

An embodiment of the application also provides a system for aggregating a microblog single message, which is formed by the server 601 and the client 701 (which are not shown in Figure). Structure of the server 601 may refer to FIG. 6 and FIG. 7. Structure of the client 701 may refer to FIG. 8, FIG. 9 and FIG. 10. It should be noted that, structure of the server 601 is not limited to the two kinds of structures illustrated with FIG. 6 and FIG. 7. Structure of the client 701 is also not limited to the two structures illustrated with FIG. 8 and FIG. 9.

Figure 11:
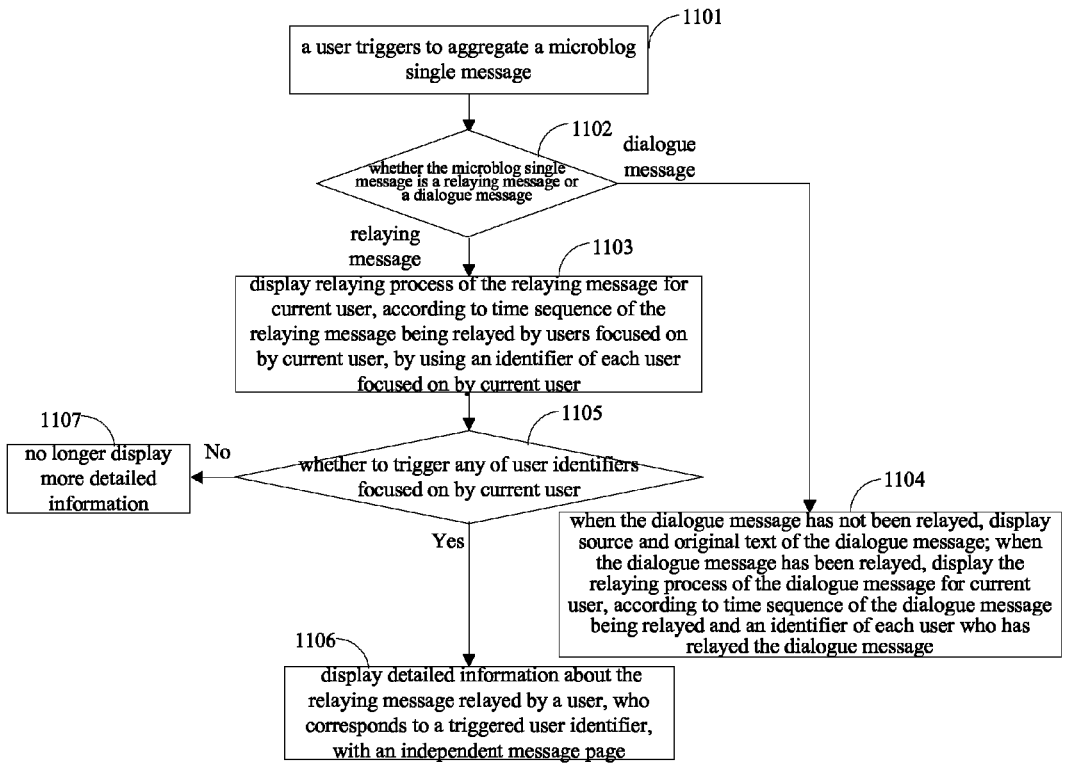
FIG. 11 is a flowchart illustrating a method for aggregating a microblog single message, in accordance with another embodiment of the application.

FIG. 11 is a flowchart illustrating a method for aggregating a microblog single message, in accordance with another embodiment of the application. As shown in FIG. 11, blocks 1101, 1102, 1103, 1105 and 1107 are respectively same as blocks 301, 302, 303, 305 and 307 in FIG. 3, which are not repeated here.

As shown in FIG. 11, after executing block 1102, when determining the microblog single message is a dialogue message, proceed with block 1104. When the dialogue message has not been relayed, display source and original text of the dialogue message. When the dialogue message has been relayed, display relaying process of the dialogue message for current user according to relaying time sequence, by using identifier of each user who has relayed the dialogue message.

Regarding block 1105, as a supplement, computer may wait for double click of current operating user, or triggering any of identifiers of all the users focused on by current user with any other mode. When determining any of identifiers of all the users focused on by current user has been triggered, proceed with block 1106. That is, display detailed information about the relaying message relayed by the user corresponding to the triggered user identifier with an independent message page, e.g., user account, relaying time, relaying location, how many users have relayed the message after being relayed by the user, and provide an entry for current user to execute further operations, e.g., copy, relay, etc.

The foregoing is only preferred embodiments of the application, which are not used for limiting the application. Any change or substitution within the technical scope disclosed by the application, which is easily occurred to a person having ordinary skill in the art, should be covered by the protection scope of the application. Thus, protection scope of the application should be determined by the claims.

The invention claimed is:

1. A method for aggregating a microblog single message, comprising:
   receiving a user instruction;
   sending a triggering message to aggregate the microblog single message to a server, according to the user instruction;
   receiving or obtaining aggregation data of the microblog single message from the server; and
   displaying the aggregation data of the microblog single message;
   wherein displaying the aggregation data of the microblog single message comprises:
   displaying the relaying process of the microblog single message, by using an independent message page with an entry of the microblog single message;
   wherein when the microblog single message comprises a relaying message, displaying the aggregation data of the microblog single message comprises,
   displaying the relaying process of the relaying message, according to relaying time sequence of the relaying message being relayed by each user focused on by the user, by using an identifier of each user focused on by the user; and wherein when the microblog single message comprises a relayed dialogue message, displaying the aggregation data of the microblog single message comprises, displaying the relaying process of the dialogue message according to relaying time sequence, by using an identifier of each user who has relayed the dialogue message.

2. The method according to claim 1, wherein when displaying the relaying process of the relaying message for the user, according to the relaying time sequence of the relaying message being relayed by each user focused on by the user, by using the identifier of each user focused on by the user, the method further comprises:

when triggering any of identifiers of all the users focused on by the user, displaying the relaying process of the relaying message for the user, according to an identifier of each user who has relayed the relaying message.

3. The method according to claim 1, wherein when displaying the relaying process of the relaying message for the user, according to the relaying time sequence of the relaying message being relayed by each user focused on by the user, by using the identifier of each user focused on by the user, the method further comprises:

when triggering any of identifiers of users focused on by the user, displaying information about the relaying message relayed by a user corresponding to the triggered user identifier for the user.

4. A client for aggregating a microblog single message, comprising a processor, a memory, and an interacting module, a data receiving and obtaining module as well as a displaying module, wherein the interacting module is to interact with a user, and send a triggering message to aggregate the microblog single message to a server according to the user instruction;

the data receiving and obtaining module is to obtain or receive information about the aggregation data of the microblog single message from the server, according to an instruction sent by the interacting module, receive or obtain the aggregation data of the microblog single message from the server according to the information; and the displaying module is to display the aggregation data of the microblog single message for the user;

wherein the client further comprises a first data storing module, a second data storing module, a determining module and an establishing module, the first data storing module is to store the aggregation data of the microblog single message received or obtained by the data receiving and obtaining module, wherein the aggregation data comprises an identifier of a node corresponding to the microblog single message and an identifier of each ancestor node of the node, the ancestor node comprises a father node of the node corresponding to the microblog single message, upwards until a root node;

the second data storing module is to store an identifier of each user focused on by the user according to time sequence, when the microblog single message is a relaying message;

the determining module is to determine, when the microblog single message is the relaying message, which of the identifier of the node corresponding to the relaying message and the identifier of each ancestor node of the node stored in the first data storing module, is stored in the second data storing module, and send a node identifier stored in the second data storing module to the displaying module;

the establishing module is to establish an independent message page with an entry of the microblog single message, when the first data storing module has stored the aggregation data of the microblog single data received or obtained by the data receiving and obtaining module from the server; and when the microblog single message is the relaying message, the displaying module is further to receive the node identifier stored in the second data storing module sent by the determining module, display a relaying process of the relaying message relayed by each user focused by the user for the user, according to relaying time sequence, by using the node identifier and the independent message page established by the establishing module; when the microblog single message is a relayed dialogue message, the displaying module is further to receive the node identifier stored in the second data storing module sent by the determining module, display a relaying process of the relaying message relayed by each user focused by the user, according to relaying time sequence, by using the node identifier and the independent message page established by the establishing module; when the microblog single message is a relayed dialogue message, the displaying module is to display the identifier of the node corresponding to the microblog single message and the identifier of each ancestor node of the node for the user, according to relaying time sequence and the aggregation data stored in the first data storing module, by using the independent message page established by the establishing module, wherein the interacting module, the displaying module, the first data storing module, the second data storing module, the determining module, and the establishing module are stored on the memory.

5. The client according to claim 4, wherein when the displaying module displays the relaying process of the relaying message relayed by each user focused on by the user for the user, according to the relaying time sequence, by using the node identifier and the independent message page established by the establishing module, the displaying module is further to, when any node identifier is triggered, display the relaying process of the relaying message for the user, by using the node identifier which has relayed the relaying message and is stored in the first data storing module; or when any node identifier is triggered, the displaying module is to display information about the relaying message which is relayed by a user corresponding to the triggered node identifier for the user.

6. The client according to claim 4, wherein the first data storing module further comprises a picture storing module, the data receiving and obtaining module further comprises a picture pulling module;

when message text comprises a thumbnail, the picture pulling module is to determine whether the picture storing module has stored the thumbnail successfully downloaded; when the picture storing module has stored the thumbnail successfully downloaded, the displaying module is further to display the thumbnail successfully downloaded; when the picture storing module doesn't store the thumbnail successfully downloaded, the picture pulling module is further to download the thumbnail from the server, add the thumbnail to be downloaded to a downloading list, initiate a process animation; when downloading is successful, the picture pulling module is further to stop the process animation, remove the thumbnail from the downloading list, and send the thumbnail successfully downloaded to the picture storing module to be stored, to facilitate the displaying module to display for the user.

7. A method for aggregating a microblog single message, comprising:
   triggering, by a user, to aggregate the microblog single message; and
   displaying a relaying process of the microblog single message for the user;
   wherein displaying the relaying process of the microblog single message for the user comprises:
   displaying the relaying process of the microblog single message for the user, by using an independent message page with an entry of the microblog single message;
   wherein displaying the relaying process of the microblog single message for the user, by using the independent message page with the entry of the microblog single message, comprises:
   when the independent message page comprises a message, displaying source of the message;
   when the message includes a dialogue message, further displaying original text of the dialogue message;
   when the message includes a relaying message with or without comments, and relaying number of the relaying message with or without comments is larger than or equal to a preset number, further displaying relaying original text and the relaying number; and
   when the dialogue message, or the relaying message with comments, or the relaying message without comments comprises a picture, further displaying a thumbnail of the picture.

8. The method according to claim 7, wherein when the dialogue message, or the relaying message with comments, or the relaying message without comments comprises the picture, further displaying the thumbnail of the picture comprises:
   when the thumbnail has been downloaded, displaying the thumbnail successfully downloaded; and
   when the thumbnail has not been downloaded, add the thumbnail to be downloaded to a downloading list, and initiate a process animation; when the downloading is successful, stop the process animation, remove the thumbnail from the downloading list, and display the thumbnail successfully downloaded.

9. The client according to claim 4, wherein when the independent message page comprises a message, the displaying module is further to display source of the message;
   when the message comprises a dialogue message, the displaying module is further to display original text of the dialogue message;
   when the message comprises a relaying message with or without comments, and relaying number of the relaying message with or without comments is larger than or equal to a preset number, the displaying module is further to display relaying original text and the relaying number;
   when the dialogue message, or the relaying message with comments, or the relaying message without comments comprises a picture, the displaying module is further to display a thumbnail of the picture.

* * * * *